United States Patent [19]
Baum

[11] Patent Number: 5,435,431
[45] Date of Patent: Jul. 25, 1995

[54] CONTAINER TIPPING APPARATUS

[75] Inventor: Bret M. Baum, North Canton, Ohio

[73] Assignee: Cardinal Packaging, Inc., Streetsboro, Ohio

[21] Appl. No.: 198,507

[22] Filed: Feb. 18, 1994

[51] Int. Cl.⁶ .............................................. B65G 47/24
[52] U.S. Cl. ................................. 198/399; 198/401; 198/412
[58] Field of Search .............. 198/374, 399, 401, 402, 198/406, 409, 412, 413

[56] References Cited

U.S. PATENT DOCUMENTS

| | | |
|---|---|---|
| 2,697,860 | 12/1954 | Anthony . |
| 3,143,223 | 8/1964 | McIntyre et al. . |
| 3,388,812 | 6/1968 | Cooper ............................ 198/412 X |
| 3,679,070 | 7/1972 | Skiba, Jr. . |
| 3,874,740 | 4/1975 | Hurd ............................... 198/402 X |
| 4,002,005 | 1/1977 | Mueller et al. . |
| 4,771,589 | 9/1988 | Mueller et al. . |
| 4,787,499 | 11/1988 | Lodi et al. ...................... 198/409 X |
| 4,799,351 | 1/1989 | Blanda ............................ 198/402 X |
| 5,287,953 | 2/1994 | Mims ............................... 198/374 |
| 5,291,983 | 3/1994 | Pegoraro et al. ............... 198/401 X |

FOREIGN PATENT DOCUMENTS

| | | | |
|---|---|---|---|
| 1511512 | 5/1969 | Germany ........................... 198/399 |
| 0131618 | 8/1982 | Japan ................................. 198/402 |
| 1384495 | 3/1988 | U.S.S.R. . | |

Primary Examiner—James R. Bidwell
Attorney, Agent, or Firm—Fay, Sharpe, Beall, Fagan, Minnich & Mckee

[57] ABSTRACT

According to the invention there is provided a tipping device comprising a conveyor, a photodetector, a chute including two selectively translatable ramps disposed at the discharge end of the conveyor, air cylinders for translating the ramps, and a tipper bar which is exposed when the ramps are translated. More particularly, when the ramps are closed, the containers simply move from the conveyor down the chute to another conveyor. When a signal generated by the photodetector is received by the air cylinders, the air cylinders retract, thus moving the two ramps to an open position, and exposing the tipper bar. The momentum from the weight and acceleration of the container as it impacts the tipper bar flips the container on its top. After receiving a second signal from the photodetector, the air cylinders extend and the ramps close so that the next container slides down the chute without engaging the tipper bar.

10 Claims, 4 Drawing Sheets

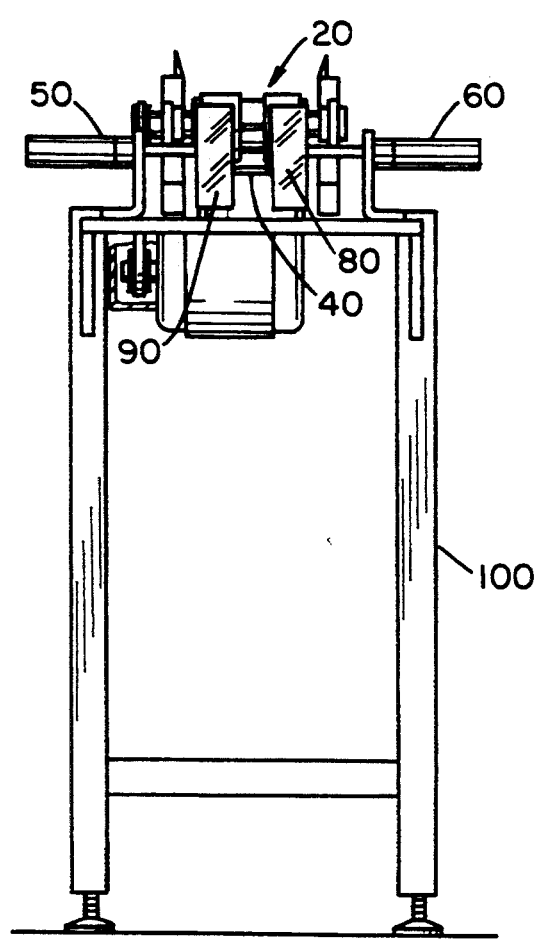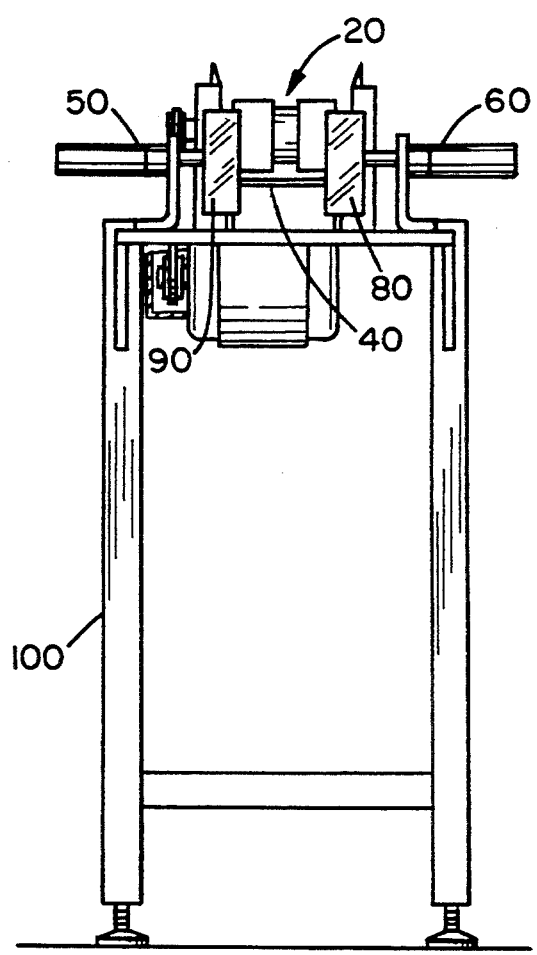

CONTAINER TIPPING APPARATUS

BACKGROUND OF THE INVENTION

This invention relates to a device for tipping containers transported on a conveyor mechanism for filling and packaging. More particularly, the invention is directed to an apparatus for use in conjunction with an ice cream filling machine wherein it is desirable, for packaging purposes, for every other container to be tipped, or rotated approximately 180°, as they are translated on the conveyor. Such tipping facilitates convenient packaging in a carton and is especially desirable for containers having tapered sides.

While the invention is particularly directed to the art of tipping containers, and will be thus described with specific reference thereto, it will be appreciated that the invention may have usefulness in other fields and applications.

Dairy containers typically have tapered side walls. Accordingly, it is generally known in the dairy industry that after a container is filled, and a lid applied, it is advantageous to tip every other container as the containers move down a conveyor so that they can be more easily packaged in the carton. For space efficiency, and due to the taper of the side walls of the containers C, shipping is more efficient when the plastic containers C are included in a box B where the containers are alternately rotated 180°, as shown in FIG. 6.

Tipping machines are known. In the past, tipping machine assemblies have included a gripping mechanism to grasp the lip of the lid of a container to effect tipping of the container to an inverted orientation. Unfortunately, such machines have never been effective or commercially successful for their tendency to pull the lid off the container.

A wide variety of tipping devices capable of tipping containers without engaging the lid are also known. However, those known devices lack a number of convenient features, such as a photodetector for detecting movement of containers on a conveyor, a chute comprised of two selectively translatable ramps for alternately tipping the containers, and a tipper bar for accomplishing the actual tipping.

For example, U.S. Pat. No. 4,002,005 to Mueller et al. shows a mechanism for alternately tipping tapered containers which are then packaged together. This patent does not show the use of a detector means detecting movement of containers. Every other container is simply automatically tipped because of the rotation of a pair of hubs. Moreover, selectively movable ramps effecting tipping of every other container are not used.

U.S. Pat. No. 4,771,589 to Mueller et al. illustrates an apparatus for forming a package of alternately inverted containers including a divided product stream wherein one of the streams is tipped and the other is not tipped. This patent lacks both a detector and selectively movable ramps. Multiple product streams may also be cumbersome.

U.S. Pat. No. 3,143,223 to Mcintyre et al. likewise teaches tipping accomplished to convert a uniform stream of tapered articles into a stream of inverted articles. This is accomplished by actuating cam surfaces to engage tipping paddles. The above noted convenient features are also lacking in this patent.

To avoid machines incorporating the defects noted above, many dairies have resorted to employing a tipper person at each machine to manually tip every other container. As can be well appreciated, however, tasks such as tipping are often more efficiently, as well as less expensively, performed by machines instead of people.

SUMMARY OF THE INVENTION

An advantage of the present invention is the provision of a tipping device for tipping containers.

A further advantage of the invention is the provision of a tipping device capable of alternately tipping containers transported on a conveyor.

A still further advantage of the invention is the provision of a tipping device using a chute comprising two ramps which are selectively movable, or translatable, in accordance with a signal provided by a detector to facilitate tipping of alternate containers.

A still further advantage of the invention is the provision of air cylinders associated with the ramps to facilitate translation of the ramps in a direction generally perpendicular to the direction of movement of containers on the conveyor.

A still further advantage of the invention is the provision of at least one tipper bar used for tipping the containers.

According to the invention there is provided a tipping device comprising a conveyor, a photodetector, a chute including two selectively translatable ramps disposed at the discharge end of the conveyor, air cylinders for translating the ramps, and tipper bars which are exposed when the ramps are translated. More particularly, when the ramps are closed, the containers simply move from the conveyor down the chute to another conveyor. When a signal generated by the photodetector is received by control circuitry, the air cylinders retract, thus moving the two ramps to an open position, and exposing the tipper bars. The momentum from the weight and acceleration of the container as it impacts a tipper bar flips the container on its top. After a second signal from the photodetector is received, the air cylinders extend and the ramps close so that the next container slides down the chute without engaging the tipper bar.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, whereby the objects contemplated are attained as hereinafter more fully set forth, specifically pointed out in the claims, and illustrated in the accompanying drawings in which:

FIG. 4 is a front elevational view of the apparatus of FIG. 1 with ramps in a closed position;

FIG. 5 is a front elevational view of the apparatus of FIG. 1 with ramps in an open position;

DETAILED DESCRIPTION OF THE PREFERRED EMBODIMENTS

Figure 1:
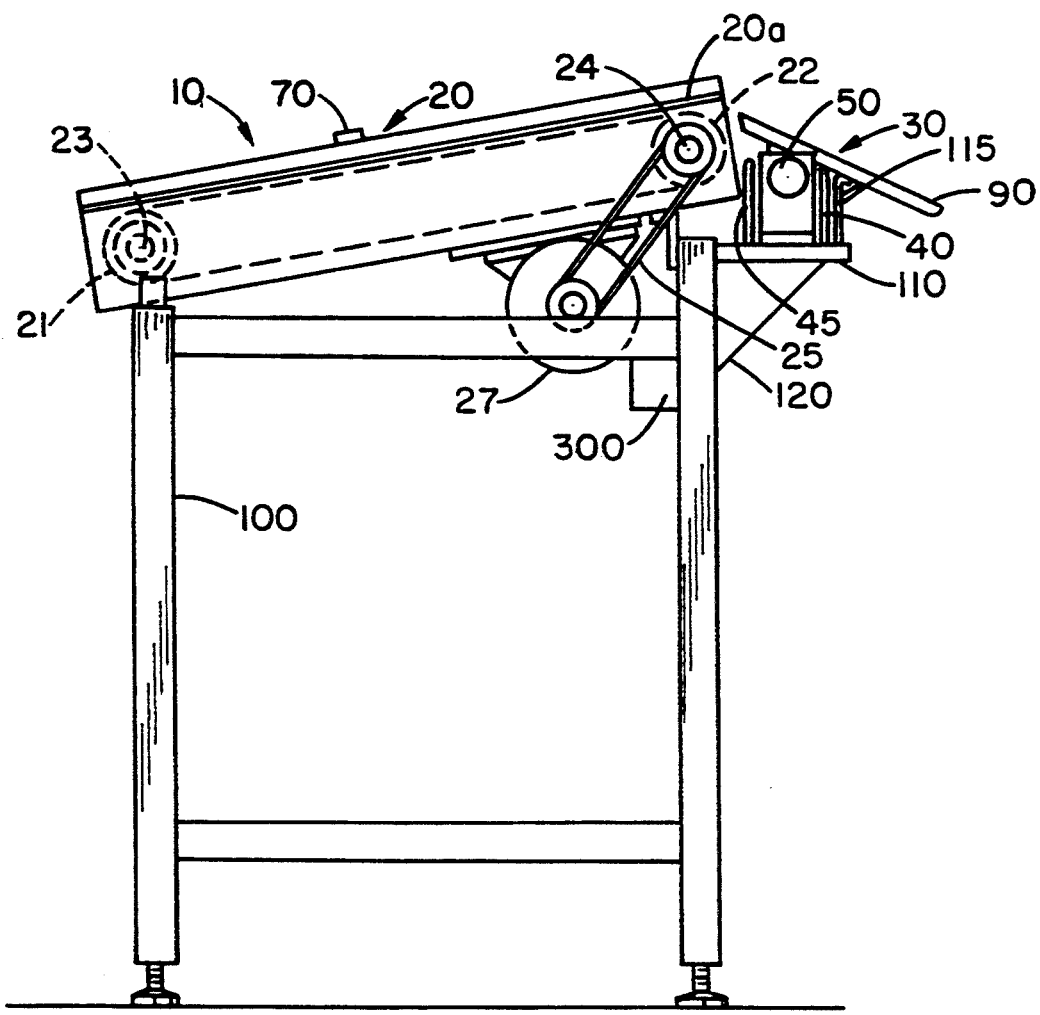
FIG. 1 is a side elevational view of the container tipping apparatus.

Referring now to the drawings wherein the showings are for purposes of illustrating the preferred embodiments of the invention only and not for purposes of limiting same, FIG. 1 provides a side elevational view of the overall preferred embodiment. As shown, the tipping apparatus, or device, 10 is comprised of a conveyor 20 having a discharge end 20a, a chute 30 disposed at the discharge end 20a, tipper bars 40, 45, an air cylinder 50 (air cylinder 60, not shown), and detector, or sensor, 70. A stand 100 is also shown to illustrate a practical implementation of the device 10. A circuit box 300 is attached to the stand 100 and contains control circuit 200 (not shown).

While the invention is not limited to the stand 100, such stand, if used, is preferably adjustable. Adjustability allows containers to be translated at a height compatible with existing filling equipment.

Figure 2:
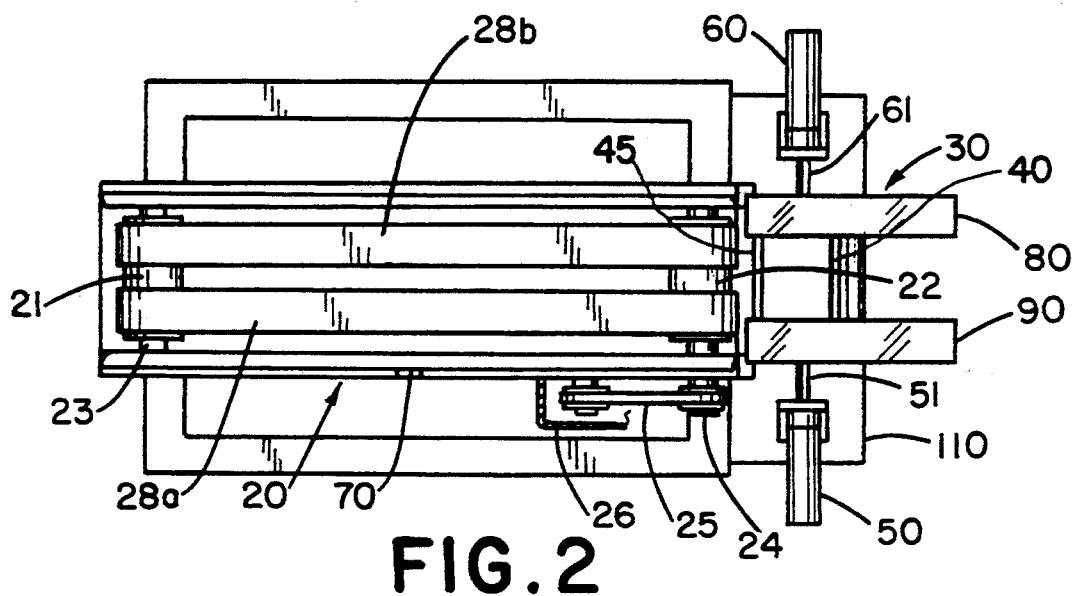
FIG. 2 is a top elevational view of the apparatus of FIG. 1.

In FIG. 2, wherein, as in all figures, like numerals designate identical elements, chute 30 is shown, including ramps 80, 90. Also illustrated are air cylinder 60 and conveyor belts 28a, 28b.

As shown in FIGS. 1 and 2, the conveyor 20 includes idler pulley 21 and drive pulley 22 which are respectively disposed on idler shaft 23 and drive shaft 24. The pulleys 21, 22 and shafts 23, 24 are shown in phantom in FIG. 1. The pulleys 21, 22 are coupled by belts 28a and 28b. The shafts 23 and 24 are appropriately spaced and rotatably fixed in the conveyor 20. The drive shaft 23 is coupled to a motor 27 via drive belt 25. The drive belt 25 is suitably encased in shield 26.

It is appreciated that the pulleys 21, 22, shafts 23, 24, belts 25, 28a, 28b, and motor 27 can be of any material and/or configuration currently known in the conveyor art. Moreover, a suitable chain may be used in lieu of drive belt 25. Additionally, shield 26 is formed to encase the drive belt 25, providing suitable protection to both workers in the vicinity of the conveyor 20 and the drive belt 25.

The chute 30 is comprised of ramps 80, 90. The ramps 80, 90 can be formed to accommodate the needs of a user. For example, the length of ramps 80, 90 may be varied. Similarly, the width of each ramp may be changed from the preferred embodiment and still fall within the scope of the invention.

Figure 3A:
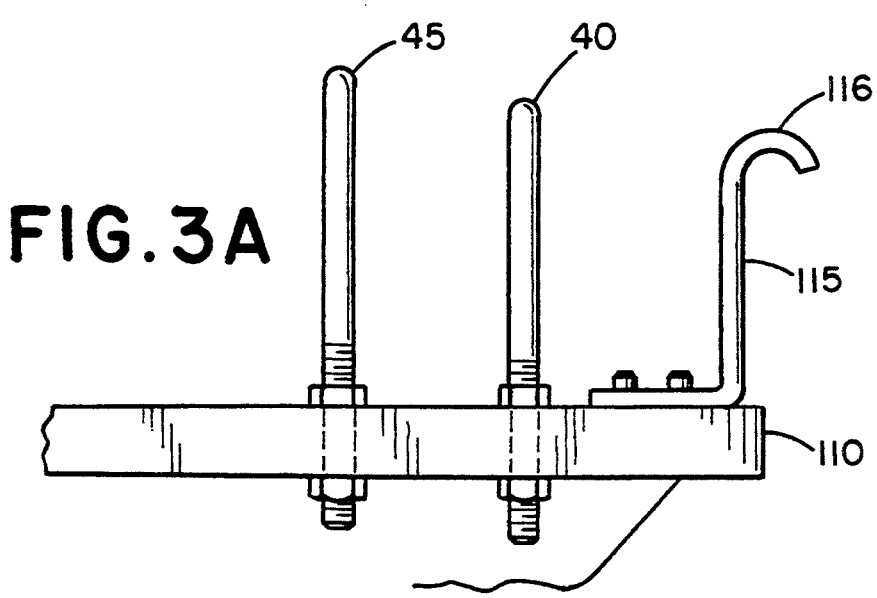
FIG. 3A is a side elevational view of the tipper bars.
Figure 3B:
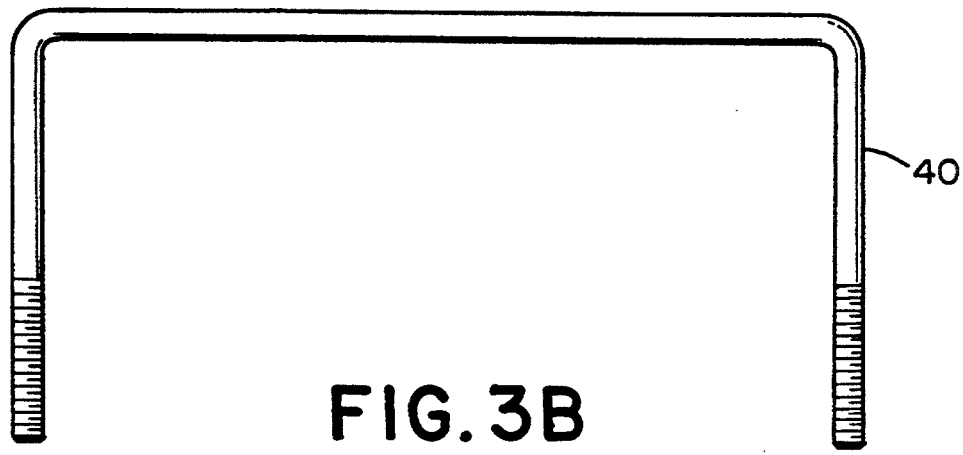
FIG. 3B is a front elevational view of a tipper bar.
Figure 6:
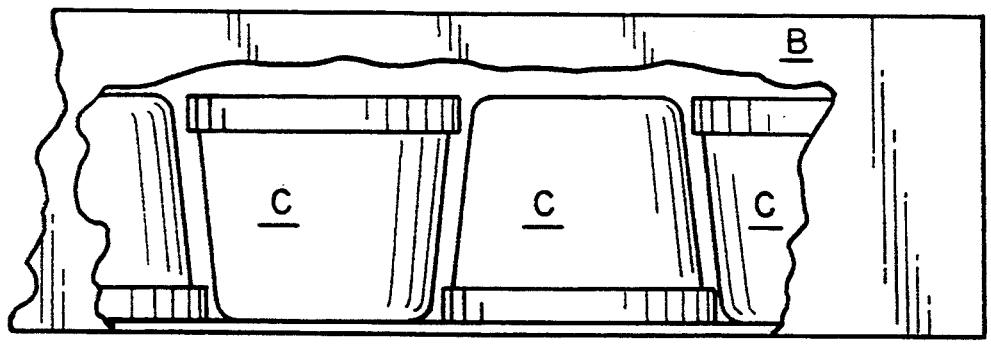
FIG. 6 is a side elevational view of a cut-away of a box holding containers; and, FIG. 7 is a schematic representation of control circuitry associated with the apparatus of FIG. 1.

As shown in FIGS. 3A and 3B, the tipper bar 45, closest to the conveyor, prevents the container from sliding rearward as it hits the forward bar. The tipper bar 40 is set to impact the container just under the center of gravity of the container so that the container will land on its lid.

Tipper bar 40 is preferably formed of ¾" round stock metal in a substantially U-shaped configuration. Tipper bar 45 may also be similarly configured. Moreover, as illustrated in FIG. 3A, the tipper bars 40, 45 are adjustably bolted to the shaft 110. It is appreciated that any suitable configuration of durable material may serve to tip the containers in place of the tipper bars 40,45.

The tipper bars 40,45 are adjustable to satisfy the requirements of the user, i.e., size of containers and desired tipping speed. More particularly, since the tipper bars 40, 45 stand in opposed spaced relation to one another, the distance between the bars 40, 45 may be adjusted. Similarly, the vertical height of the bars 40, 45 is adjustable. Adjusting the vertical height results in an adjustment of the speed of tipping. It is recognized that any known distance or height adjustment means may be used to effect adjustment.

As illustrated in FIG. 2, the air cylinders 50, 60 are supported by the device 10 in such a manner as to facilitate translation, or movement, of ramps 80, 90, respectively. The cylinders 50, 60 may be of any known type, preferably comprising an electric solenoid 4-way air valve. Any known mechanism for initiating and sustaining movement of the ramps 80,90 may be alternatively used.

The air cylinders 50, 60 include arms 51, 61, respectively. The arms 51, 61 have the ramps 80, 90 disposed at their ends. Extension and retraction of the arms 51, 61 consequently move, or translate, the ramps 80, 90 in directions generally perpendicular to the movement of the container on the conveyor 20.

The detector 70, as shown in FIGS. 1 and 2, is preferably a retroflective photoeye. However, any suitable detector, such as a limit switch, capable of sensing movement of containers on conveyor 20 is contemplated to fall within the scope of the invention. The detector 70 is preferably disposed midway along the length of the conveyor 20. However, it is appreciated that any position is suitable so long as the detection of containers on the conveyor 20 is effected.

Moreover, the output of the detector 70 is used to activate the air cylinders 50, 60 to translate, i.e., extend and/or retract, the arms 51, 61 to move the ramps 80, 90 for tipping every other 1, 2, 3, . . . etc containers. More particularly, the detector 70 generates a pulse upon detection of a container on conveyor 20. Such pulse is provided within and to suitable control circuit 200 included in circuit box 300, more particularly described with reference to FIG. 7, to control the operation of the air cylinders 50,60. The control circuit 200 may be set to toggle its output upon reception of each pulse generated by the detector 70 so that the air cylinders 50,60 alternately retract and extend the arms 51,61. Consequently, the ramps 80,90 are translated for every other container detected. Other tipping schemes, i.e., tipping every other two containers, may also be used and controlled in the present invention as, for example, described below.

The stand 100 is provided to support the device 10. Stand 100 preferably includes a shelf 110 having support 120, as shown in FIGS. 1 and 2. The shelf 110 provides an area to secure the tipper bars 40, 45. It is appreciated that any material or configuration of stand 100 may be utilized to effect the present invention.

Additionally, as shown in FIG. 3A, the shelf 110 is provided with a support 115. Support 115 provides stability to the ramps 80, 90 and is disposed so that the lip 116 coincides with, engages, and supports the ramps 80, 90. It is recognized that provision of ramps 80, 90 of sufficient strength and stability would obviate the need for support 115.

Referring now to FIG. 4, the device 10 is shown with the ramps 80, 90 in a first, or closed, position. With the ramps disposed in such a manner, the containers are conveyed from the conveyor 20 to the chute 30 and onto a second conveyor (not shown) in an upright position.

As shown in FIG. 5, the ramps 80, 90, are disposed in a second, or open, position. Consequently, the tipper bars 40, 45 are exposed so that when a container is discharged from the conveyor 20, the container falls onto the tipper bar 40 and is rotated 180°, or tipped, to an upside down position.

Figure 7:
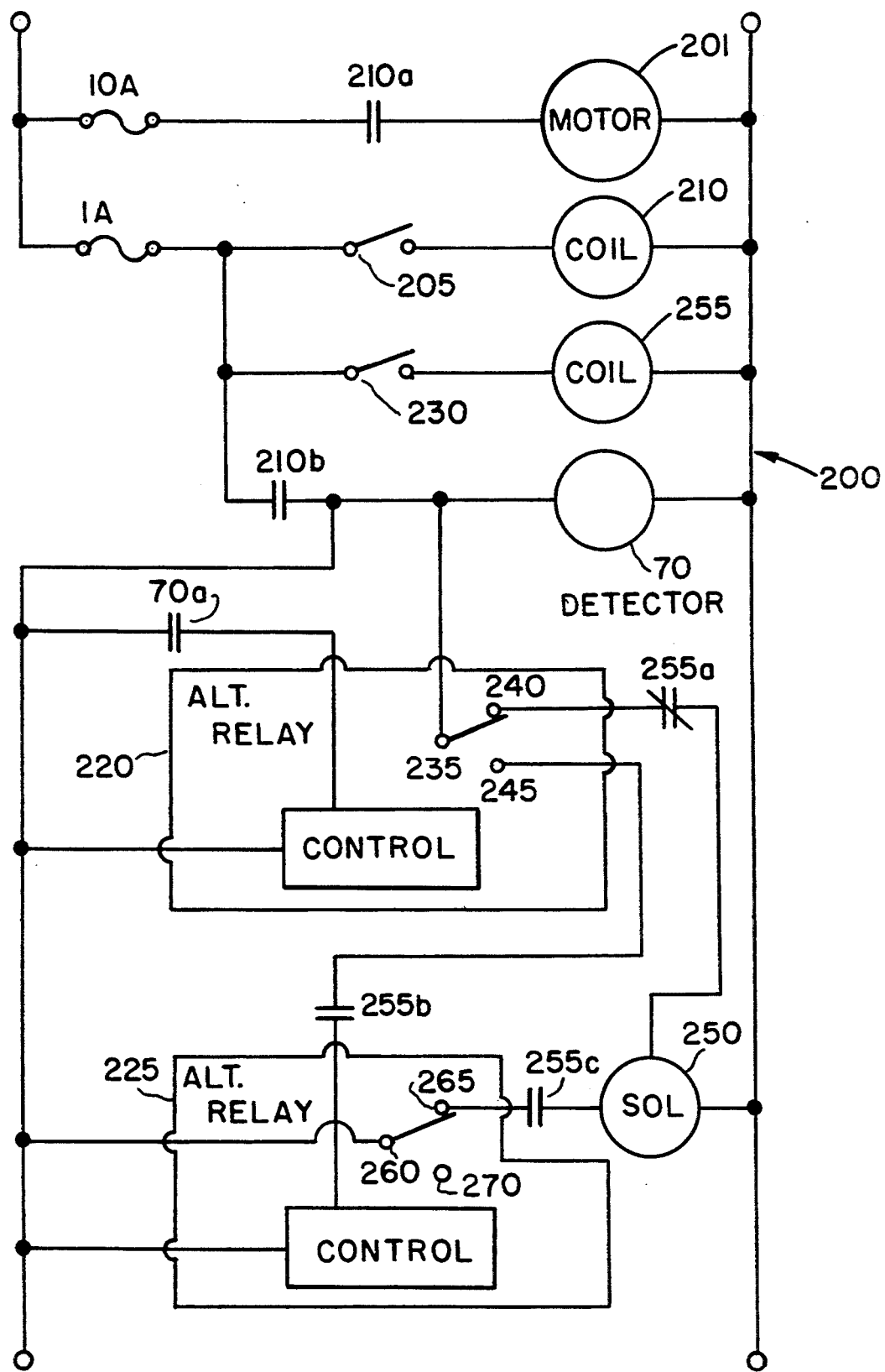

Now, referring to FIG. 7, the control circuit 200, substantially contained in circuit box 300, will be described. As can be appreciated by those skilled in the art, when switch 205 is turned on, the circuit to the coil 210 is completed. When this coil is energized then the normally open contact 210a is closed which transmits power to the motor 201 and the conveyor 20 on the tipper starts running. Contact 210b on the circuit 200 also closes and transmits power to the detector 70 and both of the alternating relays 220 and 225.

The conveyor 20 is now running and the detector 70 is mechanically connected to detect cups, or containers, traveling on the conveyor 20. With switch 230 in the open position, the alternating relay 220 is the only relay active in the circuit. As a cup passes by the detector 70, the contact 70a closes and sends a signal to the alternating relay 220. This, then, switches the power coming into terminal 235 on relay 220 exiting through terminal 240, to exit through terminal 245. Consequently, this shuts the power off to the solenoid valve 250 and switches the air supply to an opposite side of the cylinders 50, 60 and the ramps 80, 90 retract. When the ramps 80, 90 retract the cup hits the tipper bar 40 and tips on its lid. The solenoid valve 250 is electrically energized and spring returned when the power is de-energized. The spring (not shown) changes the air signal.

When a second cup is sensed passing the detector 70, the contact 70a closes again sending another signal to the alternating relay 220. The terminal 235 then switches back to transmitting power through the terminal 240. The power goes through the normally closed relay 255a and then energizes solenoid valve 250. This again overrides the spring in the solenoid valve 250 and switches the air signal back to the other side of the air cylinders 50, 60 causing the ramps 80, 90 to close. The cup then ramps out in the upright position.

In this arrangement, the alternating relay 220 switches transmission of power from terminal 235 back and forth between terminal 240 and 245 every time the detector 70 signals as a result of a passing cup. It alternates and turns the power on and off to the solenoid valve 250 which extends and retracts the ramps 80, 90, thus causing every other cup to tip.

When every other two cups is desired to be tipped, switch 230 is turned onto energize coil 255. When coil 255 is energized, the contacts 255a, b and c change state. All the normally open contacts close and all the normally closed contacts open. This introduces the alternating relay 225 into the circuit 200 which ultimately causes every other two cups to tip, as will be described.

The input signal to alternating relay 225 is fed from terminal 245 on the alternating relay 220 through the now closed contact 255b. The alternating relay 225 works similar to alternating relay 220. When it receives a signal, it switches the contact of terminal 260 from the terminal 265 to the terminal 270 position.

For example, a first cup passes the detector 70 and alternating relay 220 switches power transmission to terminal 240. The normally closed contact 255a is now open so power transmission terminates. The air cylinders 50, 60 stay retracted and the cup tips.

A second cup passes the detector 70 sending a second signal to the alternating relay 220 which switches power transmission to terminal 245 and sends a signal through the now closed contact 255b to provide an input to alternating relay 225 which switches power transmission to the terminal 265 position. This, then, transmits power through the contact 255c which is now closed and energizes the solenoid valve 250 which causes the ramps 80, 90 to close and the cup to ramp down in an upright position.

A third cup passes the detector 70, sending a signal to alternating relay 220. Again, this switches power transmission to terminal 240 and the power transmission terminates at the open contact 255a. The solenoid valve 250 stays in the same position and the cup again ramps down upright.

A fourth cup passes the detector 70, sending a signal to alternating relay 220. Again, the relay 220 switches power transmission back to the terminal 245 position which sends a signal to the input of alternating relay 225 which then causes the terminal 260 in relay 225 to switch power transmission to the terminal 270 position. Power to the solenoid valve 250 is consequently turned off which causes the air signal to make the cylinders 80, 90 retract which causes the cup to tip on the bar.

Thus, this arrangement facilitates tipping every other two cups. It is recognized that any suitable circuitry may be used to effect the aforenoted, and other, i.e., every other 3, 4, 5 . . . etc. contains, tipping schemes.

For example, the control circuitry may be any circuitry that has the ability to toggle its output upon reception of pulses. For example, a flip-flop may be used, or plug-in alternating latch relays may be desirable. Suitable microprocessor control may also be implemented.

Therefore, in operation, the containers enter onto the constant speed conveyor 20 from a production line for filling and capping. The containers travel along the conveyor 20 in a generally horizontal direction. However, a slight incline of the conveyor is shown in FIG. 1. This incline is adjustable to be adaptable to existing filling equipment.

After each container is translated, in either an upright or tipped position depending on the position of the ramps 80, 90, onto a second conveyor, it is forwarded by the second conveyor to an area for packaging. This process is repeated any number of times needed to accommodate all containers on the conveyor 20.

The invention is not limited in application to any one particular size container. For example, containers ranging from 16 ounce size to 161 ounce size may be manipulated.

Additionally, the tipper device 10 is not restricted in its tipping speed. The device 10 may tip containers anywhere in the range of 2 to 60 containers per minute, depending upon the speed of the conveyor 20, the height of the tipper bar 40, and the response time of the control circuitry and air cylinders 50, 60.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that fall within the scope of the invention.

Having thus described the invention, I claim:

1. An apparatus comprising:

a conveyor having a discharge end for moving containers in a generally horizontal direction toward the discharge end;

a chute disposed at the discharge end of the conveyor for selectively receiving the containers, the chute being comprised of two selectively translatable opposed ramps;

air cylinders connected to the ramps selectively translating the ramps from a first position for receiving the containers to a second position for allowing the containers to fall between the ramps; and, a tipper bar disposed directly below the ramps in the first position such that when the ramps are in the second position the containers fall onto the bar and are rotated.

2. An apparatus comprising:

a conveyor having a discharge end for moving containers in a generally horizontal direction toward the discharge end;

a sensor connected to the conveyor detecting the containers moving along the conveyor, the sensor generating a pulse for every container detected;

a chute disposed at the discharge end of the conveyor for selectively receiving the containers, the chute being comprised of two selectively translatable opposed ramps;

air cylinders connected to the ramps selectively translating the ramps from a first position for receiving the containers to a second position for allowing the containers to fall between the ramps in accordance with a predetermined number of pulses generated by the sensor; and, a bar disposed directly below the ramps in the first position and positioned to interfere with the fall of the containers when the ramps are in the second position so that the containers are rotated.

3. An apparatus comprising:

a conveyor having a discharge end for moving containers in a generally horizontal first direction toward the discharge end;

a sensor connected to the conveyor detecting the containers moving along the conveyor, the sensor generating a signal for every container detected;

a control circuit connected to the sensor, the control circuit toggling its output based on a predetermined number of signals generated by the sensor;

a chute disposed at the discharge end of the conveyor for selectively receiving the containers, the chute being comprised of two selectively translatable opposed ramps;

air cylinders connected to the control circuit and the ramps selectively translating the ramps from a first position for receiving the containers to a second position for allowing the containers to fall between the ramps, the translation of ramps selectively occurring based on the toggling of the output of the control circuit and in a second and a third direction perpendicular to the first direction; and, a tipper bar positioned to interfere with the fall of the containers when the ramps are in the second position so that the containers are rotated.

4. An apparatus for use with a conveyor having a discharge end for moving containers in a generally horizontal first direction toward the discharge end, the apparatus comprising:

a sensor connected to the conveyor detecting moving along the conveyor, the sensor generating a signal for every container detected;

a chute disposed at the discharge end of the conveyor for selectively receiving containers, the chute being comprised of two selectively translatable opposed ramps;

means connected to the two ramps for selectively translating the ramps from a first position for receiving the containers to a second position for allowing the containers to fall between tire ramps, the translation of ramps selectively occurring in accordance with a predetermined number of signals generated by the sensor and in a second and a third direction perpendicular to the first direction; and, tipping means positioned to interfere with the fall of the containers when the ramps are in the second position so that the containers are rotated.

5. The apparatus of claim 4 wherein the translating means comprises a pair of air cylinders respectively coupled to the two ramps.

6. An apparatus comprising:

a conveyor having a discharge end for moving containers in a generally horizontal first direction toward the discharge end;

a chute disposed at the discharge end of the conveyor for selectively receiving the containers, the chute being comprised of two selectively translatable opposed ramps;

air cylinders connected to the ramps for selectively translating the ramps from a first position for receiving the containers to a second position for allowing the containers to fall between the ramps, the translation of ramps selectively occurring in a second and a third direction perpendicular to the first direction;

a first bar positioned to interfere with the fall of the containers when the ramps are in the second position so that the containers are rotated; and, a second bar positioned between the conveyor and the first bar, the second bar preventing rearward sliding of the containers as the containers fall when the ramps are in the second position.

7. The apparatus of claim 6 further comprising a sensor connected to the conveyor for sensing movement of the containers.

8. The apparatus of claim 7 wherein the translating means includes means for selectively translating in accordance with the movement sensed by the sensor.

9. An apparatus comprising:

a conveyor having a discharge end for moving containers in a generally longitudinal first direction toward the discharge end;

a chute disposed at the discharge end of the conveyor for selectively receiving the containers, the chute being comprised of two selectively translatable opposed ramps;

means connected to the ramps for selectively translating the ramps, in accordance with a predetermined number of the containers moved along the conveyor, from a first position for receiving the containers to a second position for allowing the containers to fall between the ramps, the translation of ramps selectively occurring in a second and a third direction perpendicular to the first direction; and, means for tipping positioned to interfere with the fall of the containers when the ramps are in the second position so that the containers are rotated.

10. The apparatus of claim 9 further comprising a sensor connected to the conveyor detecting the predetermined number of the containers.

* * * * *